US011529725B2

(12) United States Patent
Greunke et al.

(10) Patent No.: US 11,529,725 B2
(45) Date of Patent: Dec. 20, 2022

(54) POWER TOOL INCLUDING ELECTROMAGNETIC CLUTCH

(71) Applicant: MILWAUKEE ELECTRIC TOOL CORPORATION, Brookfield, WI (US)

(72) Inventors: Kyle Greunke, Milwaukee, WI (US); Benjamin R. Suhr, Milwaukee, WI (US); Brett J. VanDaalwyk, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 592 days.

(21) Appl. No.: 16/158,716

(22) Filed: Oct. 12, 2018

(65) Prior Publication Data

US 2019/0118362 A1   Apr. 25, 2019

Related U.S. Application Data

(60) Provisional application No. 62/636,365, filed on Feb. 28, 2018, provisional application No. 62/623,160, (Continued)

(51) Int. Cl.
*B25D 16/00* (2006.01)
*F16D 27/11* (2006.01)
(Continued)

(52) U.S. Cl.
CPC ............ *B25D 16/003* (2013.01); *B25B 23/14* (2013.01); *B25D 11/125* (2013.01);
(Continued)

(58) Field of Classification Search
CPC . B25D 16/003; B25D 2250/145; F16D 13/24; F16D 27/108–112; F16D 27/118
(Continued)

(56) References Cited

U.S. PATENT DOCUMENTS 1,122,380 A * 12/1914 Forster ................. F16D 27/112
192/84.96
2,020,637 A * 11/1935 Fawick .................. F16D 13/30
192/66.22
(Continued)

FOREIGN PATENT DOCUMENTS

CN       201735835 U      2/2011
CN       102233448 A     11/2011
(Continued)

OTHER PUBLICATIONS

European Patent Office Examination Report for Application No. 18201305.2 dated Apr. 28, 2020 (4 pages).
(Continued)

*Primary Examiner* — Joshua G Kotis
(74) *Attorney, Agent, or Firm* — Michael Best & Friedrich LLP

(57) ABSTRACT

A clutch mechanism for use in a rotary power tool having a motor comprises an input member to which torque from the motor is transferred and an output member movable between a first position in which the output member is engaged with the input member for co-rotation therewith, and a second position in which the output member is disengaged from the input member. The clutch mechanism further comprises a biasing member biasing the output member into the first position and an electromagnet which, when energized, moves the output member from the first position to the second position.

20 Claims, 11 Drawing Sheets

Related U.S. Application Data filed on Jan. 29, 2018, provisional application No. 62/575,022, filed on Oct. 20, 2017.

(51) Int. Cl.
| | |
|---|---|
| *F16D 27/108* | (2006.01) |
| *F16D 27/118* | (2006.01) |
| *B25B 23/14* | (2006.01) |
| *B25D 11/12* | (2006.01) |

(52) U.S. Cl.
CPC ............ *F16D 27/108* (2013.01); *F16D 27/11* (2013.01); *F16D 27/118* (2013.01); *B25D 16/006* (2013.01); *B25D 2250/145* (2013.01); *B25D 2250/165* (2013.01)

(58) Field of Classification Search
USPC ................. 173/178; 192/84.31, 84.92, 66.22
See application file for complete search history.

(56) References Cited

U.S. PATENT DOCUMENTS

| | | | |
|---|---|---|---|
| 2,668,917 A * | 2/1954 | Uher ................. | H02K 23/52 |
| | | | 290/48 |
| 2,966,977 A * | 1/1961 | Johnson ............. | F16D 27/112 |
| | | | 192/84.91 |
| 3,390,749 A * | 7/1968 | Pospisil ............. | F16D 27/12 |
| | | | 192/84.941 |
| 3,923,126 A | 12/1975 | Bidanset | |
| 4,063,600 A | 12/1977 | Krzes | |
| 4,152,833 A | 5/1979 | Phillips | |
| 4,249,117 A | 2/1981 | Leukhardt et al. | |
| 4,317,176 A | 2/1982 | Saar et al. | |
| 4,385,442 A | 5/1983 | Nitschmann et al. | |
| 4,410,846 A | 10/1983 | Gerber et al. | |
| 4,448,261 A | 5/1984 | Kousek et al. | |
| 4,553,326 A | 11/1985 | West | |
| 4,638,870 A | 1/1987 | Kousek | |
| 4,662,492 A | 5/1987 | Troeder | |
| 4,773,518 A * | 9/1988 | Raad ................. | F16D 27/118 |
| | | | 192/69.81 |
| 4,793,453 A | 12/1988 | Nishimura | |
| 5,076,120 A * | 12/1991 | Lin .................... | F16D 27/118 |
| | | | 81/54 |
| 5,125,160 A | 6/1992 | Gassen | |
| 5,401,124 A | 3/1995 | Hettich | |
| 5,584,619 A | 12/1996 | Guzzella | |
| 5,704,435 A | 1/1998 | Meyer et al. | |
| 5,879,111 A | 3/1999 | Stock et al. | |
| 5,914,882 A | 6/1999 | Yeghiazarians | |
| 5,954,457 A | 9/1999 | Stock et al. | |
| 5,996,707 A | 12/1999 | Thome et al. | |
| 6,111,515 A | 8/2000 | Schaer et al. | |
| 6,415,875 B1 | 7/2002 | Meixner et al. | |
| 6,644,450 B2 | 11/2003 | Kristen et al. | |
| 6,705,410 B2 | 3/2004 | Ziegler | |
| 6,842,987 B1 | 1/2005 | Martinsson et al. | |
| 6,843,140 B2 | 1/2005 | Osselmann et al. | |
| 6,863,165 B2 | 3/2005 | Koslowski | |
| 6,981,557 B2 | 1/2006 | Boeni et al. | |
| 7,011,165 B2 | 3/2006 | Kristen et al. | |
| 7,055,620 B2 | 6/2006 | Nadig et al. | |
| 7,306,046 B2 | 12/2007 | Meixner et al. | |
| 7,372,226 B2 | 5/2008 | Wiker et al. | |
| 7,410,006 B2 | 8/2008 | Zhang et al. | |
| 7,438,169 B2 * | 10/2008 | Swanson ............. | F16D 25/0635 |
| | | | 192/85.21 |
| 7,506,694 B2 | 3/2009 | Stirm et al. | |
| 7,552,781 B2 | 6/2009 | Zhang et al. | |
| 7,628,219 B2 | 12/2009 | Frauhammer et al. | |
| 7,699,118 B2 | 4/2010 | Stetter et al. | |
| 7,861,659 B2 | 1/2011 | Gillis et al. | |
| 8,235,139 B2 | 8/2012 | Chen et al. | |
| RE44,311 E | 6/2013 | Zhang et al. | |
| 8,555,997 B2 | 10/2013 | Carrier et al. | |
| 8,579,041 B2 | 11/2013 | Pellenc | |
| 8,727,941 B2 | 5/2014 | Aoki | |
| RE44,993 E | 7/2014 | Vanko et al. | |
| RE45,112 E | 9/2014 | Zhang et al. | |
| 8,833,484 B2 | 9/2014 | Binder et al. | |
| 9,038,743 B2 | 5/2015 | Aoki | |
| 9,144,875 B2 | 9/2015 | Schlesak et al. | |
| 9,339,923 B2 | 5/2016 | Aoki | |
| 9,364,944 B2 | 6/2016 | Aoki | |
| 9,505,097 B2 | 11/2016 | Aoki et al. | |
| 9,533,406 B2 | 1/2017 | Aoki | |
| 9,962,807 B2 | 5/2018 | Klee et al. | |
| 2004/0011632 A1 | 1/2004 | Hellmann et al. | |
| 2004/0181951 A1 | 9/2004 | Wittke | |
| 2006/0124331 A1 * | 6/2006 | Stirm ................. | F16D 43/208 |
| | | | 173/178 |
| 2008/0021590 A1 | 1/2008 | Vanko et al. | |
| 2008/0110653 A1 * | 5/2008 | Zhang ................. | H02P 29/032 |
| | | | 173/1 |
| 2009/0065225 A1 | 3/2009 | Foster et al. | |
| 2009/0138116 A1 | 5/2009 | Austin et al. | |
| 2010/0263591 A1 | 10/2010 | Nielsen et al. | |
| 2011/0073341 A1 * | 3/2011 | Elsmark ............. | B25B 23/14 |
| | | | 173/178 |
| 2012/0036725 A1 | 2/2012 | Osborne et al. | |
| 2012/0061116 A1 * | 3/2012 | Aoki ................... | B24B 47/26 |
| | | | 173/178 |
| 2012/0255752 A1 | 10/2012 | Aoki | |
| 2013/0081840 A1 * | 4/2013 | Aoki ................... | B25D 17/26 |
| | | | 173/213 |
| 2013/0189901 A1 | 7/2013 | Klee et al. | |
| 2013/0319710 A1 | 12/2013 | Aoki et al. | |
| 2014/0053419 A1 | 2/2014 | Leh et al. | |
| 2014/0166323 A1 | 6/2014 | Cooper | |
| 2014/0216773 A1 | 8/2014 | Steurer | |
| 2014/0231113 A1 | 8/2014 | Steurer | |
| 2015/0075827 A1 | 3/2015 | Ikuta | |
| 2016/0080810 A1 | 3/2016 | Dutta et al. | |
| 2016/0089757 A1 | 3/2016 | Wimitzer et al. | |
| 2016/0167212 A1 | 6/2016 | Wyler et al. | |
| 2016/0288308 A1 | 10/2016 | Kuhnle et al. | |
| 2016/0354888 A1 | 12/2016 | Huber et al. | |
| 2017/0173749 A1 | 6/2017 | Stock et al. | |
| 2017/0173750 A1 | 6/2017 | Stock et al. | |
| 2017/0180536 A1 | 6/2017 | Stock et al. | |
| 2018/0043521 A1 | 2/2018 | Moessnang et al. | |

FOREIGN PATENT DOCUMENTS

| | | |
|---|---|---|
| CN | 102274993 A | 12/2011 |
| CN | 102794477 A | 11/2012 |
| CN | 102990121 A | 3/2013 |
| CN | 203304623 U | 11/2013 |
| CN | 103029105 B | 10/2015 |
| CN | 105190032 A | 12/2015 |
| CN | 104440739 B | 6/2016 |
| DE | 2933076 C2 | 12/1982 |
| DE | 202011110069 U1 | 4/2013 |
| DE | 102011089343 A1 | 6/2013 |
| DE | 102016203925 A1 | 9/2017 |
| EP | 345655 B1 | 3/1994 |
| EP | 1398119 A1 | 3/2004 |
| EP | 2612733 A2 | 7/2013 |
| EP | 2617529 A2 | 7/2013 |
| EP | 2656977 A2 | 10/2013 |
| EP | 2578362 B1 | 7/2014 |
| EP | 2982864 A1 | 2/2016 |
| EP | 3050676 A1 | 8/2016 |
| EP | 3069824 A1 | 9/2016 |
| EP | 2390062 B1 | 3/2017 |
| GB | 1148917 A | 4/1969 |
| GB | 2400811 | 10/2004 |
| WO | WO 2009032314 | 3/2009 |
| WO | 2009136839 A1 | 11/2009 |
| WO | WO 2011039542 | 4/2011 |

(56) References Cited

FOREIGN PATENT DOCUMENTS

| WO | 2011085194 A1 | 7/2011 |
|---|---|---|
| WO | 2017001363 A1 | 1/2017 |

OTHER PUBLICATIONS

International Search Report and Written Opinion for Application No. PCT/US2018/057534 dated Feb. 20, 2019, 20 pages.
European Patent Office Search Report for Application No. 18201305.2 dated Apr. 5, 2019, 7 pages.
Chinese Patent Office Second Office Action for Application No. 201811226324.1 dated Oct. 21, 2020 (7 pages including statement of relevance).
European Patent Office Action for Application No. 18201305.2 dated Dec. 15, 2020 (4 pages).
European Patent Office Action for Application No. 18201305.2 dated May 10, 2021 (4 pages).

\* cited by examiner

POWER TOOL INCLUDING ELECTROMAGNETIC CLUTCH

CROSS-REFERENCE TO RELATED APPLICATIONS

This application claims priority to U.S. Provisional Patent Application No. 62/575,022 filed on Oct. 20, 2017, the entire content of which is incorporated herein by reference. This application also claims priority to U.S. Provisional Patent Application No. 62/623,160 filed on Jan. 29, 2018, the entire content of which is incorporated herein by reference. This application also claims priority to U.S. Provisional Patent Application No. 62/636,365 filed on Feb. 28, 2018, the entire content of which is incorporated herein by reference.

FIELD OF THE INVENTION

The present invention relates to power tools, and more particularly to power tools including electromagnetic clutch mechanisms.

BACKGROUND OF THE INVENTION

Power tools can include a clutch mechanism to selectively permit a spindle to receive torque from an output shaft of a motor. The clutch mechanism may include an input member that receives torque from the motor and an output member that selectively receives torque from the input member to drive rotation of the spindle.

SUMMARY OF THE INVENTION

The present invention provides, in one aspect, a clutch mechanism for use in a rotary power tool having a motor, the clutch mechanism comprising an input member to which torque from the motor is transferred and an output member movable between a first position in which the output member is engaged with the input member for co-rotation therewith, and a second position in which the output member is disengaged from the input member. The clutch mechanism also comprises a biasing member biasing the output member into the first position and an electromagnet which, when energized, moves the output member from the first position to the second position.

The present invention provides, in another aspect, a rotary hammer adapted to impart axial impacts to a tool bit, the rotary hammer comprising a housing, a motor supported by the housing, a battery for supplying power to the motor when activated, and a spindle coupled to the motor for receiving torque from the motor, causing the spindle to rotate. The rotary hammer also comprises a reciprocation mechanism operable to create a variable pressure air spring within the spindle and an anvil received within the spindle for reciprocation in response to the pressure of the air spring, the anvil imparting axial impacts to the tool bit. The rotary hammer also comprises a bit retention assembly for securing the tool bit to the spindle. The rotary hammer also comprises an electromagnetic clutch mechanism switchable between a first state, in which torque is transferred from the motor to the spindle, and a second state in which the spindle does not receive torque from the motor. The rotary hammer is operable to produce an average long-duration power output between about 2000 Watts and about 3000 Watts.

The present invention provides, in yet another aspect, a rotary power tool comprising a housing, a motor supported by the housing, and an output member that selectively receives torque from the motor, causing the output member to rotate. The rotary power tool also includes an electromagnetic clutch mechanism switchable between a first state, in which torque is transferred from the motor to the output member, and a second state in which the output member does not receive torque from the motor. The rotary power tool also includes a braking member for braking the output member when the electromagnetic clutch mechanism is switched from the first state to the second state. The electromagnetic clutch mechanism is switched from the first state to the second state when a condition is detected.

The present invention provides, in yet another aspect, a method of operating a rotary power tool. The method comprises activating a motor to transfer torque to an output member, detecting a condition, activating an electromagnetic clutch mechanism in response to the detected condition, discontinuing torque transfer from the motor to the output member, and braking the output member after torque transfer from the motor has been discontinued.

The present invention provides, in yet another aspect, a clutch mechanism for use in a rotary power tool having a motor. The clutch mechanism comprises an input member to which torque from the motor is transferred and an output member that selectively receives torque from the input member. One of the input member or output member is movable between a first position, in which the input member and output member are engaged for co-rotation, and a second position in which the input member and output member are disengaged or disengageable, thereby discontinuing torque transfer from the motor. The clutch mechanism also comprises an electromagnet which, when energized, moves the moveable one of the input member or output member between the first position and the second position.

The present invention provides, in yet another aspect, a clutch mechanism for use in a rotary power tool having a motor. The clutch mechanism comprises an input member to which torque from the motor is transferred and an output member that selectively receives torque from the input member. The input member is movable between a first position, in which the input member and output member are disengageable to permit relative rotation therebetween, and a second position, in which the input member and output member are engaged for co-rotation. The clutch mechanism further comprises an electromagnet which, when energized at a first strength, moves the input member from the first position to the second position.

The present invention provides, in yet another aspect, a rotary hammer adapted to impart axial impacts to a tool bit. The rotary hammer comprises a housing, a motor supported by the housing, a battery for supplying power to the motor when activated, and a spindle coupled to the motor for receiving torque from the motor, causing the spindle to rotate. The rotary hammer further comprises a reciprocation mechanism operable to create a variable pressure air spring within the spindle and an anvil received within the spindle for reciprocation in response to the pressure of the air spring. The anvil imparts axial impacts to the tool bit. The rotary hammer further comprises a bit retention assembly for securing the tool bit to the spindle and any of the aforementioned clutch mechanisms of the present invention.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
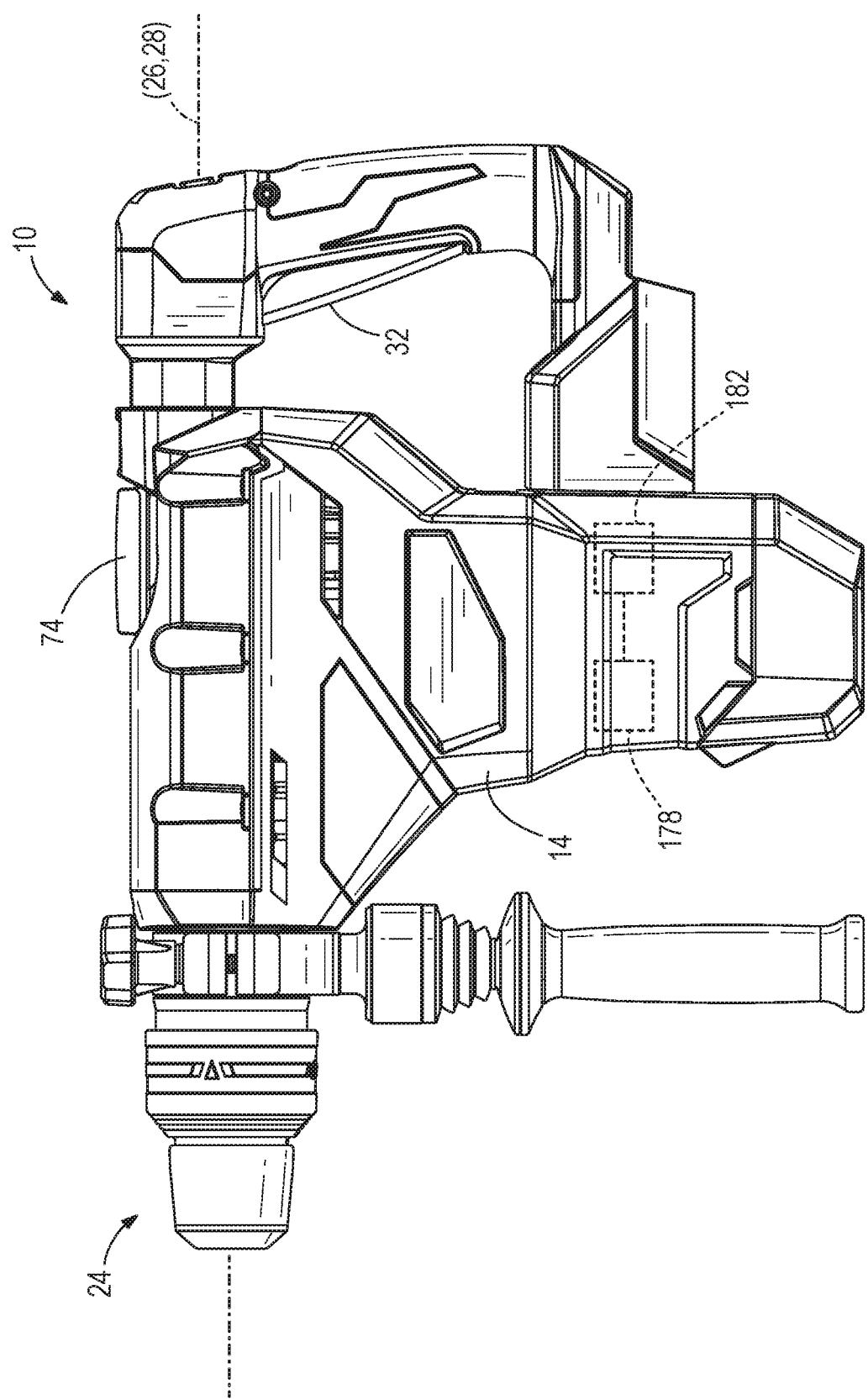
FIG. 1 is a plan view of a rotary hammer.
Figure 2:
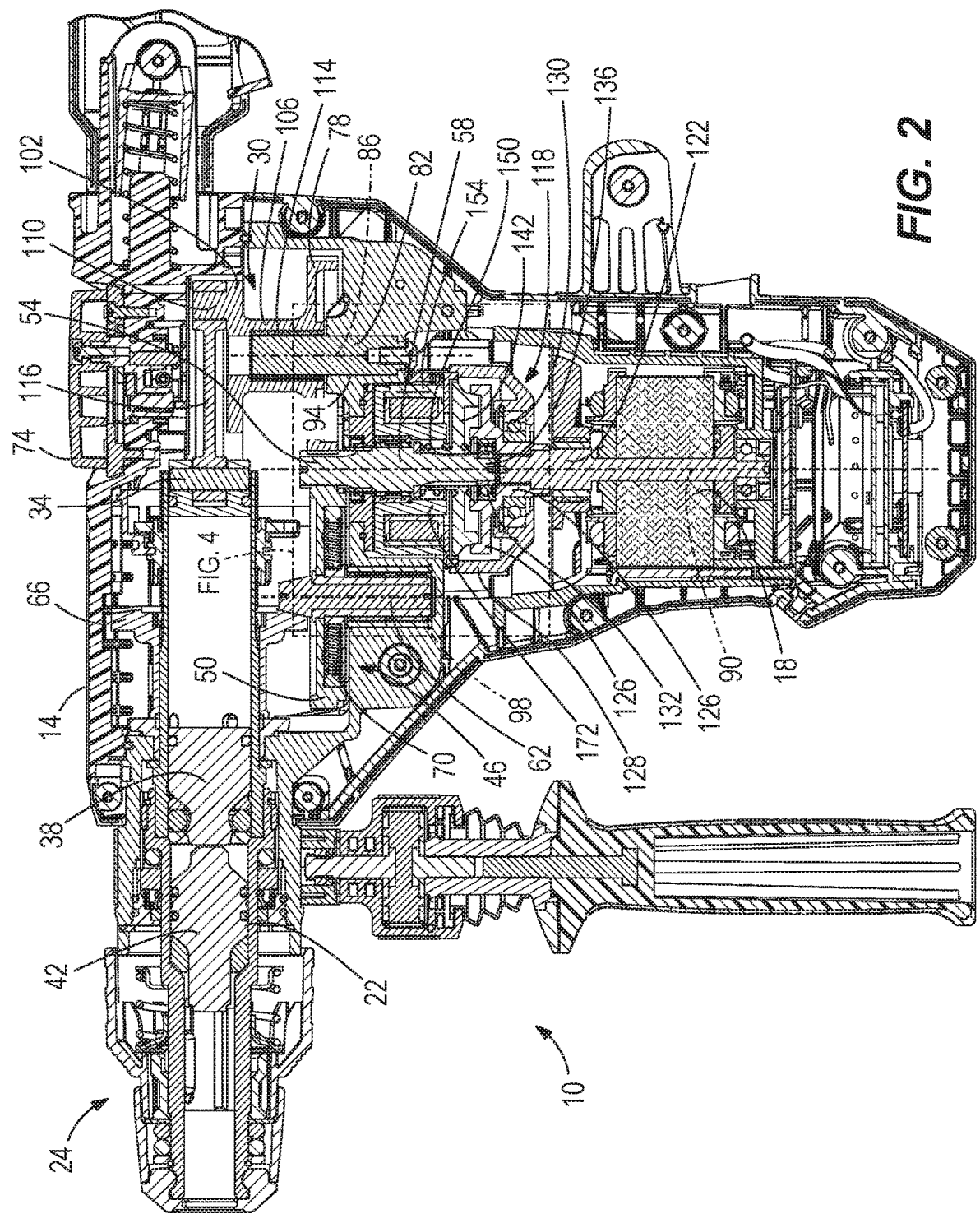
FIG. 2 is a cross-sectional view of the rotary hammer of FIG. 1 with portions removed.

FIGS. 1 and 2 illustrate a rotary power tool, such as rotary hammer 10, according to an embodiment of the invention. The rotary hammer 10 includes a housing 14, a motor 18 disposed within the housing 14, and a rotatable spindle 22 coupled to the motor 18 for receiving torque from the motor 18. In the illustrated construction, the rotary hammer 10 includes a quick-release mechanism 24 coupled for co-rotation with the spindle 22 to facilitate quick removal and replacement of different tool bits. The tool bit may include a necked section or a groove in which a detent member of the quick-release mechanism 24 is received to constrain axial movement of the tool bit to the length of the necked section or groove. The rotary hammer 10 defines a tool bit axis 26, which in the illustrated embodiment is coaxial with a rotational axis 28 of the spindle 22.

The motor 18 is configured as a DC motor that receives power from an on-board power source (e.g., a battery, not shown). The battery may include any of a number of different nominal voltages (e.g., 12V, 18V, etc.), and may be configured having any of a number of different chemistries (e.g., lithium-ion, nickel-cadmium, etc.). In some embodiments, the battery is a battery pack removably coupled to the housing. Alternatively, the motor 18 may be powered by a remote power source (e.g., a household electrical outlet) through a power cord. The motor 18 is selectively activated by depressing an actuating member, such as a trigger 32, which in turn actuates an electrical switch. The switch is electrically connected to the motor 18 via a top-level or master controller 178, or one or more circuits, for controlling operation of the motor 18.

In some embodiments, the rotary hammer 10 is capable of producing an average long-duration power output between about 2000 Watts and about 3000 Watts. In other words, the rotary hammer 10 is operable to produce between about 2000 Watts and about 3000 Watts of power over a full discharge of a battery. In some embodiments, the rotary hammer 10 is capable of producing approximately 2100 Watts of power over a full discharge of a battery. In some embodiments, the rotary hammer delivers between 70 N-m and 100 N-m of torque at the tool bit. In other embodiments, the rotary hammer delivers approximately 80 N-m of torque at the tool bit.

Figure 3:
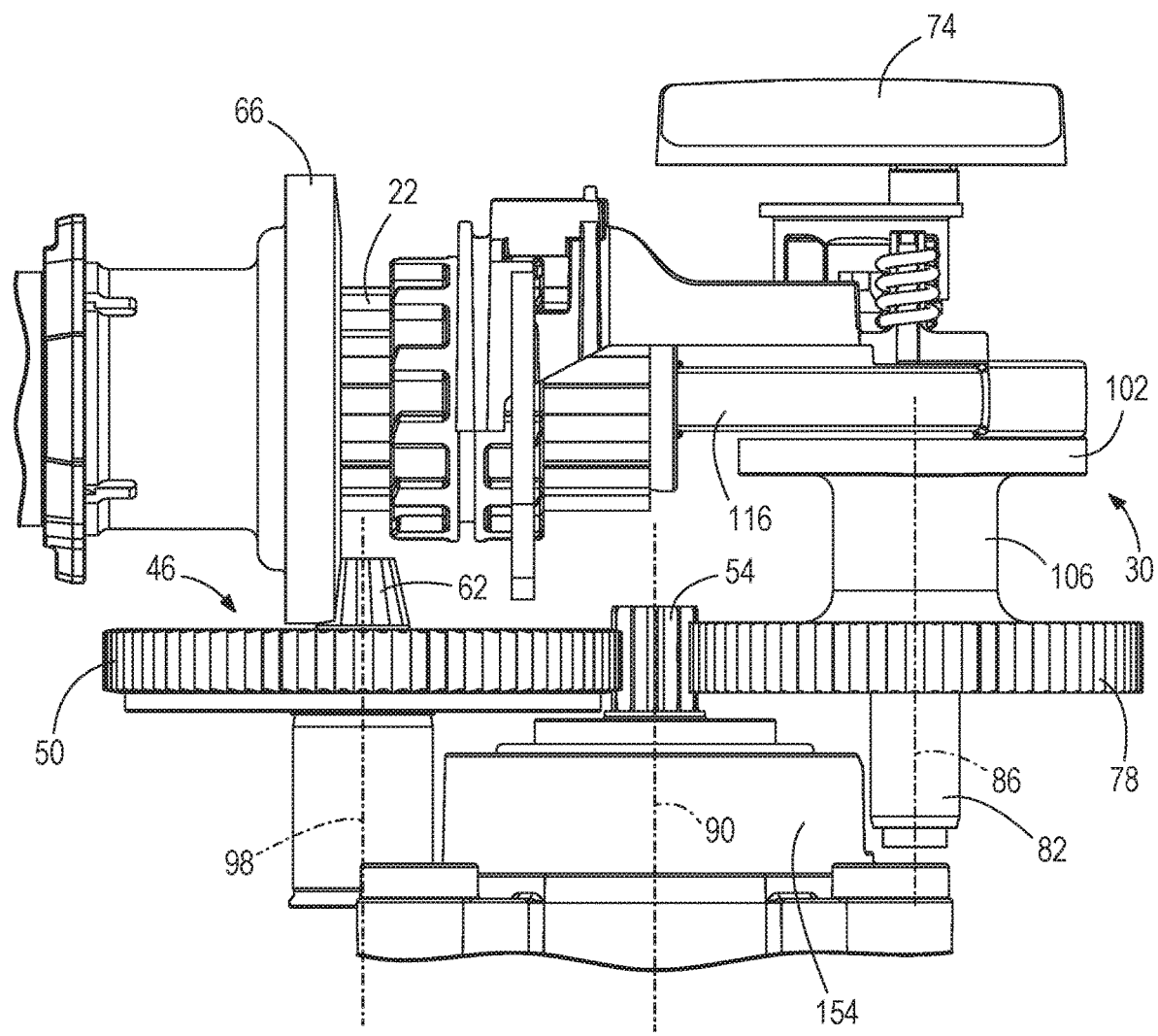
FIG. 3 is an enlarged plan view of the rotary hammer of FIG. 1 with portions removed.

The rotary hammer 10 further includes an impact mechanism 30 (FIG. 2) having a reciprocating piston 34 disposed within the spindle 22, a striker 38 that is selectively reciprocable within the spindle 22 in response to reciprocation of the piston 34, and an anvil 42 that is impacted by the striker 38 when the striker reciprocates toward the tool bit. Torque from the motor 18 is transferred to the spindle 22 by a transmission 46 (FIG. 3). In the illustrated construction of the rotary hammer 10, the transmission 46 includes an input gear 50 engaged with a pinion 54 on an intermediate shaft 58 (FIG. 4) that is selectively driven by the motor 18, an intermediate pinion 62 coupled for co-rotation with the input gear 50, and an output gear 66 coupled for co-rotation with the spindle 22 and engaged with the intermediate pinion 62. The output gear 66 is secured to the spindle 22 using a spline-fit or a key and keyway arrangement, for example, that facilitates axial movement of the spindle 22 relative to the output gear 66 yet prevents relative rotation between the spindle 22 and the output gear 66. A clutch mechanism 70 is incorporated with the input gear 50 to limit the amount of torque that may be transferred from the motor 18 to the spindle 22.

The impact mechanism 30 is driven by another input gear 78 that is rotatably supported within the housing 14 on a stationary intermediate shaft 82, which defines a central axis 86 that is offset from a rotational axis 90 of the intermediate shaft 58 and pinion 54. A bearing 94 (e.g., a roller bearing, a bushing, etc.; FIG. 1) rotatably supports the input gear 78 on the stationary intermediate shaft 82. As shown in FIG. 1, the respective axes 86, 90 of the intermediate shaft 82 and intermediate shaft 58 are parallel. Likewise, respective axes 90, 98 of the intermediate shaft 58 and the intermediate pinion 62 are also parallel. The impact mechanism 30 also includes a crank shaft 102 having a hub 106 and an eccentric pin 110 coupled to the hub 106. The hub 106 is rotatably supported on the stationary shaft 82 above the input gear 78 by a bearing 114 (e.g., a roller bearing, a bushing, etc.). The impact mechanism 30 further includes a connecting rod 116 interconnecting the piston 34 and the eccentric pin 110.

Figure 4:
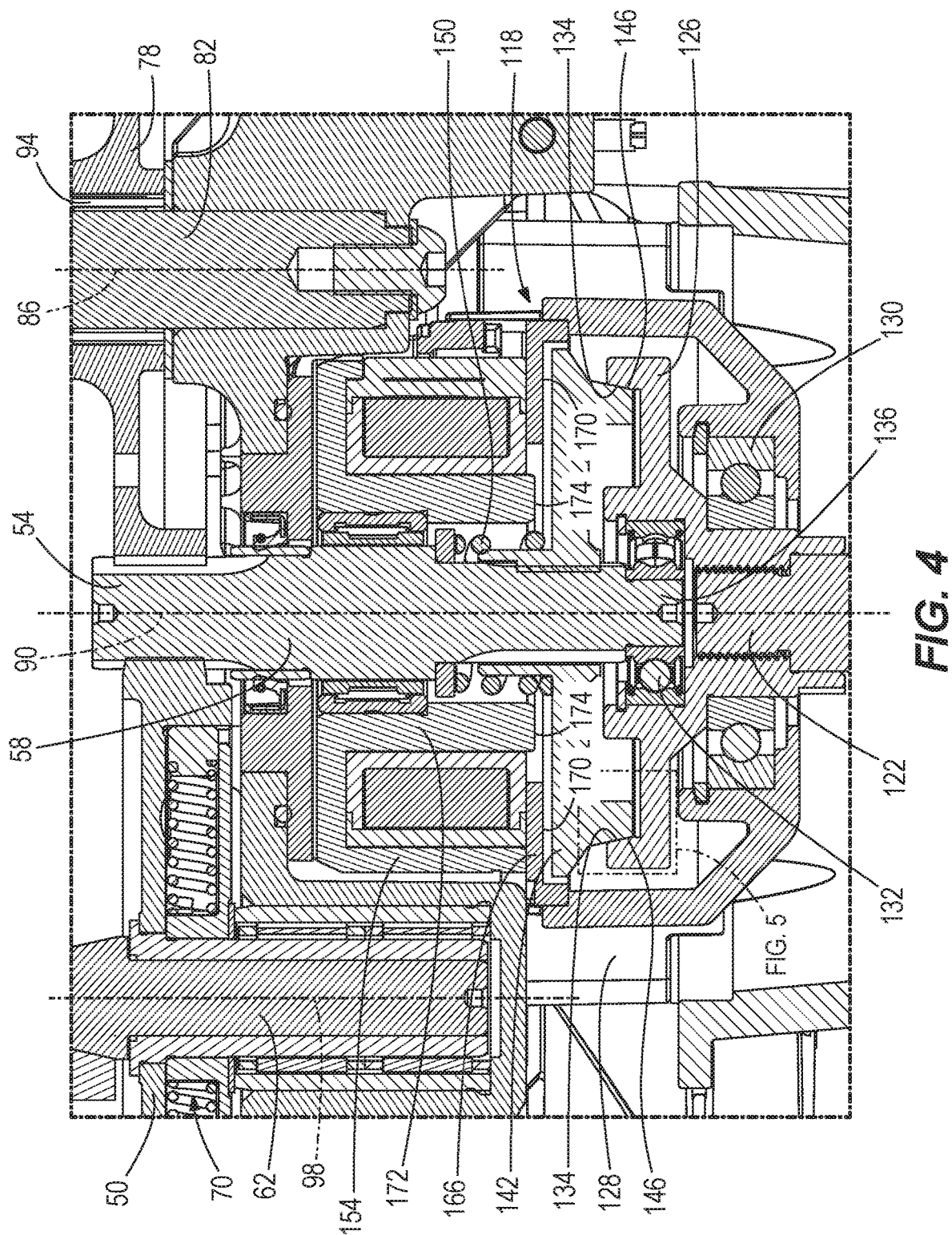
FIG. 4 is a cross-sectional view of an electromagnetic clutch mechanism of the rotary hammer of FIG. 1.
Figure 5:
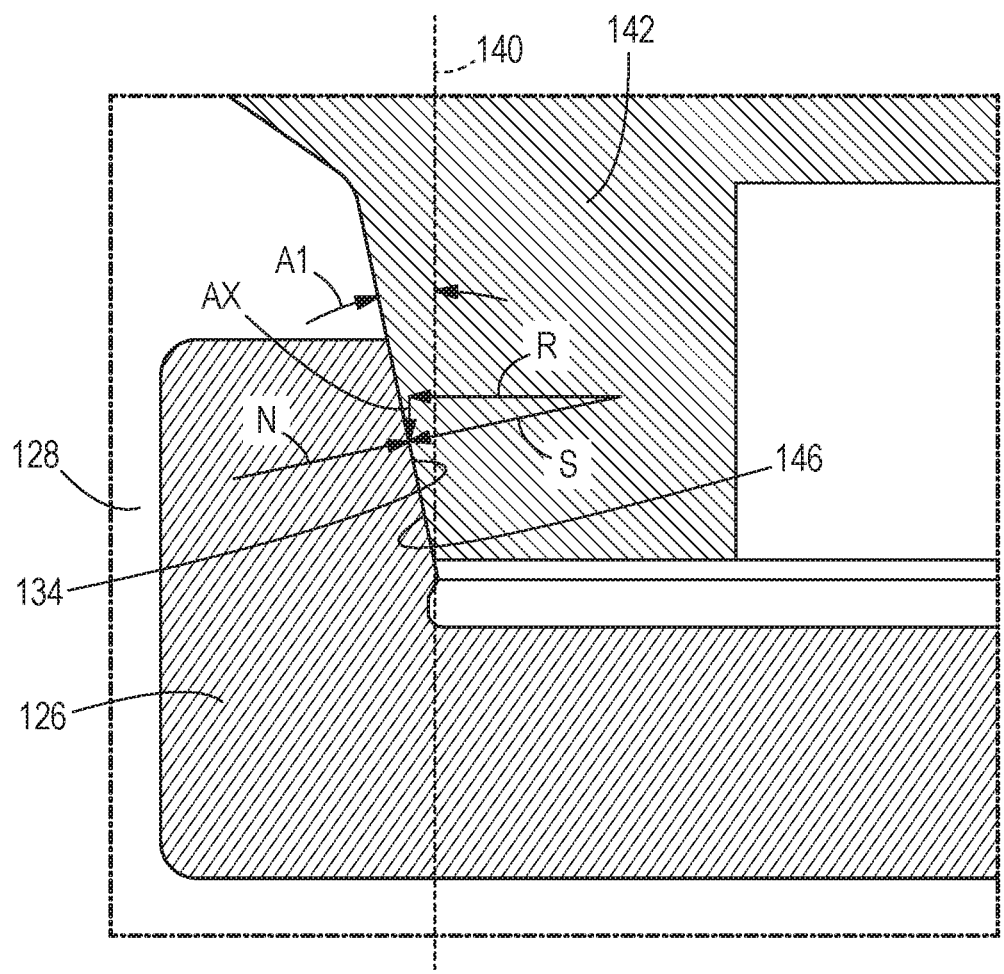
FIG. 5 is an enlarged cross-sectional view of the electromagnetic clutch mechanism of FIG. 4.

As shown in FIGS. 4 and 5, the rotary hammer 10 includes an electromagnetic clutch mechanism 118 upstream of the clutch mechanism 70 for transferring torque from an output shaft 122 of the motor 18 to the intermediate shaft 58. When driven by the motor 18, the output shaft 122 rotates about the axis 90. The electromagnetic clutch mechanism 118 includes an input member, such as a clutch driver 126, that is coupled to the output shaft 122 of the motor 18 for co-rotation therewith. A bearing 130 rotatably supports the clutch driver 126 within a gear case 128. Another bearing 132 is arranged within the clutch driver 126 to rotatably support a distal end 136 of the intermediate shaft 58 opposite the pinion 54.

As shown in FIG. 5, the clutch driver 126 has a first surface 134 that defines an acute angle A1 with respect to the axis 90. For illustration purposes, a reference axis 140 that is parallel to axis 90 has been shown in FIG. 5 to illustrate the angle A1. In some embodiments, the angle A1 is between 0 degrees and about 24 degrees. In other embodiments, the angle A1 is between about 10 degrees and about 15 degrees. In some embodiments, the angle A1 is approximately 12 degrees. In some embodiments, such as the one shown, the first surface 134 is a conical surface.

With continued reference to FIGS. 4 and 5, the electromagnetic clutch mechanism 118 also includes an output member, such as a clutch plate 142, that is coupled to the intermediate shaft 58 so that the intermediate shaft 58 co-rotates with the clutch plate 142. In some embodiments, the intermediate shaft 58 is splined and the clutch plate 142 is secured to the intermediate shaft 58 via a spline fit, such that the clutch plate 142 is axially movable with respect to the intermediate shaft 58 but cannot rotate relative to the intermediate shaft 58. The clutch plate 142 includes a second surface 146 (FIG. 5) that is configured to frictionally engage the first surface 134 of the clutch driver 126. In some embodiments, the second surface 146 is a conical surface.

The clutch plate 142 is axially moveable with respect to the clutch driver 126 and is biased by a spring 150 into a first position shown in FIGS. 4 and 5, in which the clutch plate 142 is engaged with the clutch driver 126 for co-rotation therewith. In the first or "driven" position of the clutch plate 142, the co-rotational engagement between the clutch driver 126 and the clutch plate 142 occurs as a result of a frictional force developed between the surfaces 134, 146 from an applied force S imparted by the spring 150 and transferred through the clutch plate 142. As shown in FIG. 5, the spring force S can be resolved into a radial force R oriented perpendicular to the axis 140 and axial force AX that is parallel with the axis 140. In response, the clutch driver 126 applies a normal force N against the second surface 146 of the clutch plate 142 along the same line of action as the spring force S, thereby creating friction between the clutch driver 126 and the clutch plate 142, rotationally unitizing the clutch driver 126 and the clutch plate 142. The selection of angle A1 allows for a sufficient amount of torque transmission during operation while yielding a small enough radial force R that the clutch driver 126 does not flex or deflect.

With reference to FIG. 4, the electromagnetic clutch mechanism 118 also includes an electromagnet 154 that is arranged about the intermediate shaft 58. In some embodiments, the electromagnet 154 is arranged within the intermediate shaft 58. A ring-shaped brake member 166 is arranged between the electromagnet 154 and the clutch plate 142. The brake member 166 has a braking surface 170 that faces in the direction of the clutch plate 142. A core 172 of the electromagnet 154 also has a braking surface 174 that is coplanar with braking surface 170 and faces in the direction of the clutch plate 142.

Figure 8:
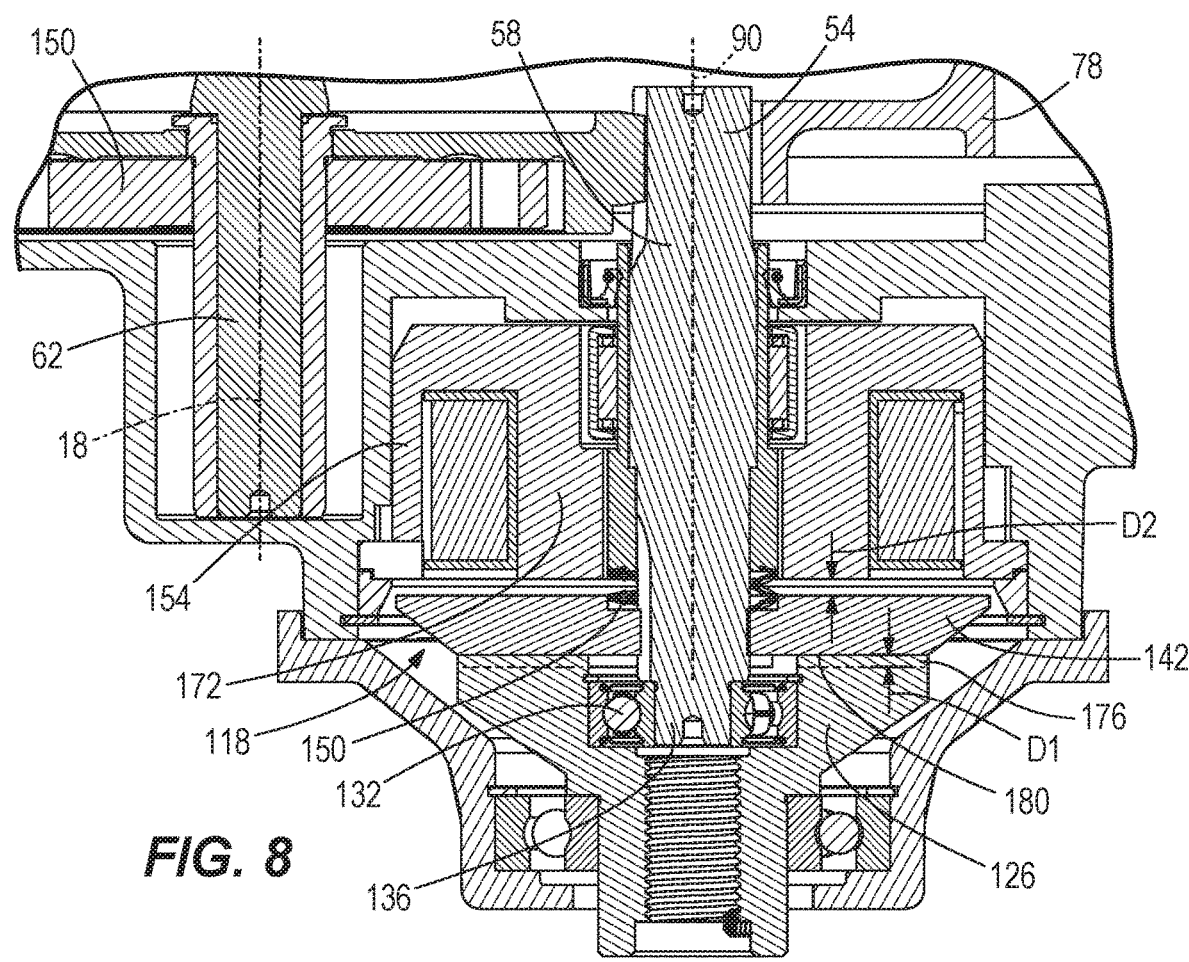
FIG. 8 is a cross-sectional view of another embodiment of an electromagnetic clutch mechanism for use with the rotary hammer of FIG. 1 with portions omitted.
Figure 9:
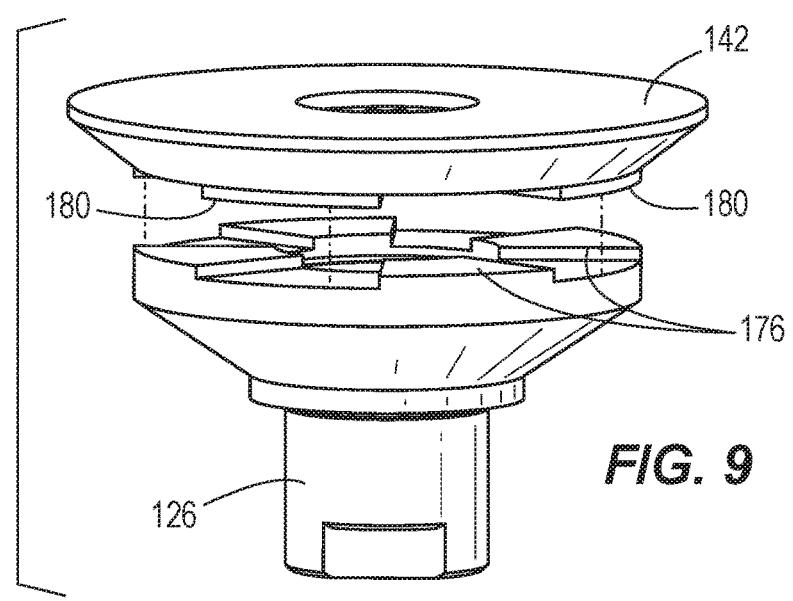
FIG. 9 is a perspective view of an input member and an output member of the clutch mechanism of FIG. 9.

In a different embodiment shown in FIGS. 8 and 9, instead of the frusto-conical first surface 134, the clutch driver 126 has a first plurality of teeth 176, and instead of the frusto-conical second surface 146, the clutch plate 142 has a second plurality of teeth 180. The teeth 176, 180 both extend a distance D1 from the clutch driver 126 and clutch plate 142, respectively. In this embodiment, the dedicated braking surfaces 170, 174 are omitted. In the first or "driven" position of the clutch plate 142, the co-rotational engagement between the clutch driver 126 and the clutch plate 142 occurs as a result of the teeth 176 mating with the teeth 180 due to the biasing force of spring 150. While in the first or "driven" position, a gap distance D2 is maintained between the clutch plate 142 and the electromagnet 154. The distance D2 is greater than the distance D1.

As shown schematically in FIG. 1, the rotary hammer 10 also includes a controller 178 and a 9-axis sensor 182, such as a gyroscope, an accelerometer, or a magnetometer configured to determine the relative orientation and movement of the housing 14 about the tool bit axis 26. The controller 182 is electrically connected with the motor 18, the sensor 182, and the electromagnet 154. During operation of the rotary hammer 10, it is possible for the tool bit to become seized in concrete or other material. However, because the motor 18 continues transmitting torque to the spindle 22, the rotary hammer 10 can suddenly and unexpectedly rotate about the tool bit axis 26. As described further below, the electromagnetic clutch mechanism 118 substantially prevents this from happening.

With reference to FIG. 1, the rotary hammer 10 includes a mode selection member 74 rotatable by an operator to switch between three modes. In a "hammer-drill" mode, the motor 18 is drivably coupled to the piston 34 for reciprocating the piston 34 while the spindle 22 rotates. In a "drill-only" mode, the piston 34 is decoupled from the motor 18 but the spindle 22 is rotated by the motor 18. In a "hammer-only" mode, the motor 18 is drivably coupled to the piston 34 for reciprocating the piston 34 but the spindle 22 does not rotate.

In operation, an operator selects either hammer-drill mode or drill-only mode with the mode selection member 74. The operator then depresses the trigger 32 to activate the motor 18. The electromagnet 154 is initially de-energized and the clutch plate 142 is biased into the first position, causing the electromagnetic clutch mechanism 118 to be in a first state in which the clutch plate 142 frictionally engages the clutch driver 126 via the first and second surfaces 134, 146 as described above. The motor output shaft 122 rotates the clutch driver 126, which causes the clutch plate 142 and the intermediate shaft 58 to co-rotate with the motor shaft 122, allowing the clutch plate 142 to receive torque from the motor 18. The rotation of the pinion 54 of the intermediate shaft 58 causes the input gear 50 to rotate. Rotation of the input gear 50 causes the intermediate pinion 62 to rotate, which drives the output gear 66 on the spindle 22, causing the spindle 22 and the tool bit to rotate.

Rotation of the pinion 54 also causes the input gear 78 to rotate about the intermediate shaft 82, which causes the crankshaft 122 and the eccentric pin 110 to rotate as well. If "hammer-drill" mode has been selected, rotation of the eccentric pin 110 causes the piston 34 to reciprocate within the spindle 22 via the connecting rod 116, which causes the striker 38 to impart axial blows to the anvil 42, which in turn causes reciprocation of the tool bit against a workpiece. Specifically, a variable pressure air pocket (or an air spring) is developed between the piston 34 and the striker 38 when the piston 34 reciprocates within the spindle 22, whereby expansion and contraction of the air pocket induces reciprocation of the striker 38. The impact between the striker 38 and the anvil 42 is then transferred to the tool bit, causing it to reciprocate for performing work on workpiece.

During operation of the rotary hammer 10 in either the hammer-drill mode or drill-only mode, the controller 178 repeatedly samples the output of the 9-axis sensor 182 to measure the rotational speed (i.e., in degrees of rotation per second) of the housing 14 about the tool bit axis 26. In some embodiments, the controller 178 measures the rotational speed of the housing 14 about the tool bit axis 26 every five milliseconds. If, during operation, a condition is detected, such as the rotational speed of the rotary hammer 10 exceeding a threshold value for a predetermined consecutive number of samples, the controller 178 energizes the electromagnet 154. As a result of the electromagnetic force developed by the electromagnet 154 and applied to the clutch plate 142, the clutch plate 142 is translated along the intermediate shaft 158, against the bias of the spring 150, from the first or driven position to a second position, causing the electromagnetic clutch mechanism 118 to be in a second state in which the clutch plate 142 is disengaged from the clutch driver 126. Because the clutch plate 142 is no longer engaged with the clutch driver 126, the clutch plate 142 no longer receives torque from the motor 18.

In the second state of the electromagnetic clutch mechanism 118, corresponding to the second or disengaged position of the clutch plate 142, the clutch plate 142 is braked via frictional contact with the braking surfaces 170, 174 of the brake member 166 and the core 172, respectively, thereby rapidly decelerating rotation of the clutch plate 142. Because the clutch plate 142 is coupled for co-rotation with the intermediate shaft 58, rotation of the intermediate shafts 58, 62, the output gear 66, and the spindle 22 is also rapidly decelerated and brought to a stop. In this manner, if the housing 14 is rotated too quickly about the tool bit axis 26, the controller 178 quickly detects this event and disengages the electromagnetic clutch mechanism 118 to quickly discontinue rotation of the spindle 22. Also, if an operator releases the trigger 32, the electromagnetic clutch mechanism 118 is disengaged in the same manner as described above. Because the condition is accurately detected when the sensor 182 senses that the rotational speed of the housing 14 exceeds a threshold value, the electromagnetic clutch mechanism 118 reduces or eliminates nuisance shutdowns.

The embodiment of the clutch mechanism shown in FIGS. 8 and 9 operates in the same manner, except that in the first or "driven" position of the clutch plate 142, the co-rotational engagement between the clutch driver 126 and the clutch plate 142 occurs as a result of the teeth 176 mating with the teeth 180 due to the biasing force of spring 150. When the electromagnet 154 is energized, the clutch plate 142 is translated along the intermediate shaft 58, against the bias of the spring 150, from the first or driven position to the second position, switching the electromagnetic clutch mechanism 118 into a second state in which the clutch plate 142 is disengaged from the clutch driver 126. Because the electromagnetic force of the electromagnet 154 is offset by the biasing force of the spring 150, the clutch plate 142 is axially translated away from the clutch driver 126 by a distance greater than D1, such that the respective teeth 176, 180 of the clutch driver 126 and clutch plate 142 are separated, but less than a distance D2, such that clutch plate 142 remains separated from the electromagnet 154. In the second state of the electromagnetic clutch mechanism 118, corresponding to the second or disengaged position of the clutch plate 142, the clutch plate 142 is not braked, or only experiences incidental braking against electromagnet 154. Because the clutch plate 142 is no longer engaged with the clutch driver 126, the clutch plate 142 no longer receives torque from the motor 18, and eventually discontinues rotation.

Figure 6:
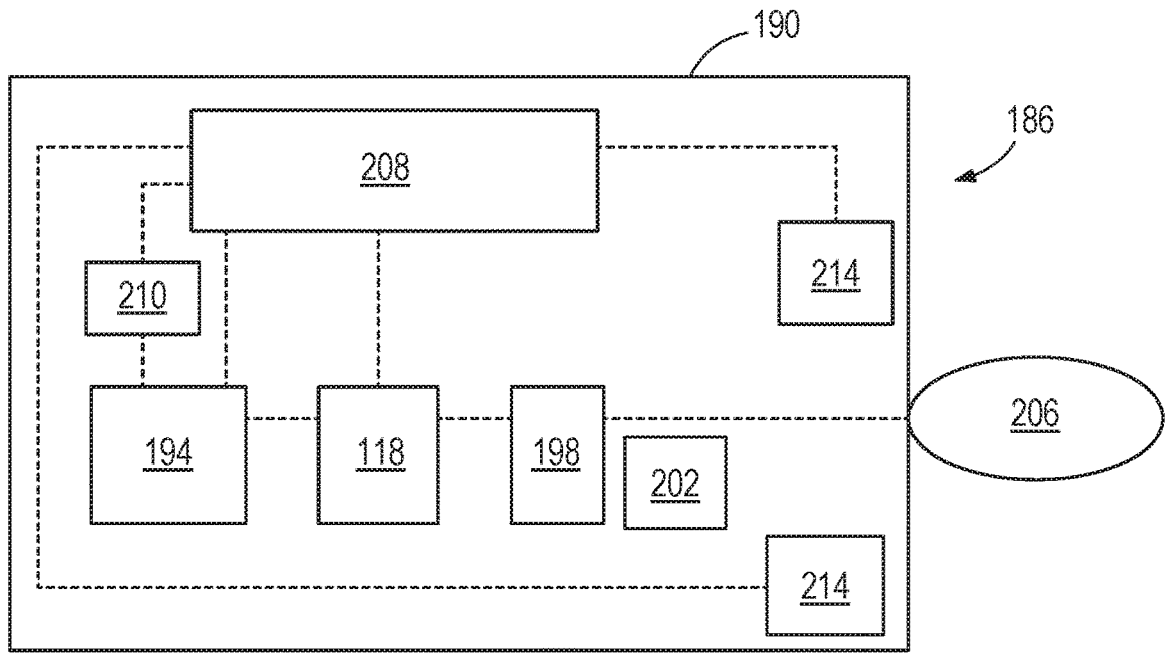
FIG. 6 is a schematic of a power tool with an electromagnetic clutch mechanism.

As shown schematically in FIG. 6, the electromagnetic clutch mechanism 118 can be used in a power tool 186 besides the rotary hammer 10, including but not limited to: a table saw, a miter saw, a cut off saw, a chainsaw, a band saw, a chop saw, a circular saw, a drill driver, a mag stand drill, a core drill, a grinder, a drain cleaner, a high-torque impact driver, a high-torque impact wrench, or a pipe threader. The tool 186 includes a housing 190, a motor 194 supported by the housing 190, and an output member 198 that selectively receives torque from the motor 194, causing the output member 198 to rotate. The tool 186 also includes a braking member 202 affixed to the housing 190 configured to decelerate and eventually stop rotation of the output member 198. In the same manner as described above, when the electromagnetic clutch mechanism 118 is activated and switched from the first state to the second state, energization of the electromagnet 154 disengages the output member 198 from its rotational coupling with the motor 194 and moves the output member 198 into contact with the braking member 202, decelerating and eventually stopping rotation of the output member 198. In some embodiments of the tool 186, the tool 186 includes a work element 206, including but not limited to a tool bit or saw blade, which is directly or indirectly attached to the output member 198.

The tool 186 includes a controller 208, which can communicate with one or more sensors 210, 214 to determine whether and when to activate the electromagnetic clutch mechanism 118 and thereby switch it from the first state to the second state when a condition is detected. In some embodiments, the sensor 210 is detects current drawn by the motor 194, and the detected condition is a motor current or a change in motor current. In other embodiments, the sensor 210 is a Hall-effect sensor for detecting the rotational speed of the motor 194, and the detected condition is a motor speed or a change in motor speed. Thus, for example, the one or more sensors 210 can detect whether the tool 186 is cutting an inappropriate material by detecting that the motor current, the change in motor current, the motor speed, or the change in motor speed has exceeded a threshold value, and in response the controller 208 activates the electromagnetic clutch mechanism 118. Activation of the electromagnetic clutch mechanism 118 switches it from the first state to the second state, in which the output member 198 no longer receives torque from the motor 194 and the output member 198 is braked by the braking member 202.

In some embodiments, the detected condition is a combination of an increase in motor current and a simultaneous decrease in motor speed. Thus, the one or more sensors 210 can detect whether there is an increase in motor current and a simultaneous decrease in motor speed, and in response the controller 208 activates the electromagnetic clutch mechanism 118, switching it from the first state to the second state, in which the output member 198 no longer receives torque from the motor 194 and the output member 198 is braked by the braking member 202.

In other embodiments, the one or more sensors 214 are located proximate the work element 206, such as a saw blade, of the tool 186. The one or more sensors 214 are configured to detect at least one of a change in capacitance or a change in resistance, allowing the sensors 214 to detect the presence of a foreign body, such as a hand, proximate the work element 206. Thus, while the motor 194 is rotating the work element 206 via the output member 198, if an operator places a hand proximate the work element 206, the one or more sensors 214 detect a condition of a change in capacitance or resistance, indicating the presence of a foreign body proximate the work element 206. In response, the controller 208 activates the electromagnetic clutch mechanism 118, switching it from the first state to the second state, in which the output member 198 no longer receives torque from the motor 194 and the output member 198 is braked by the braking member 202.

Figure 7:
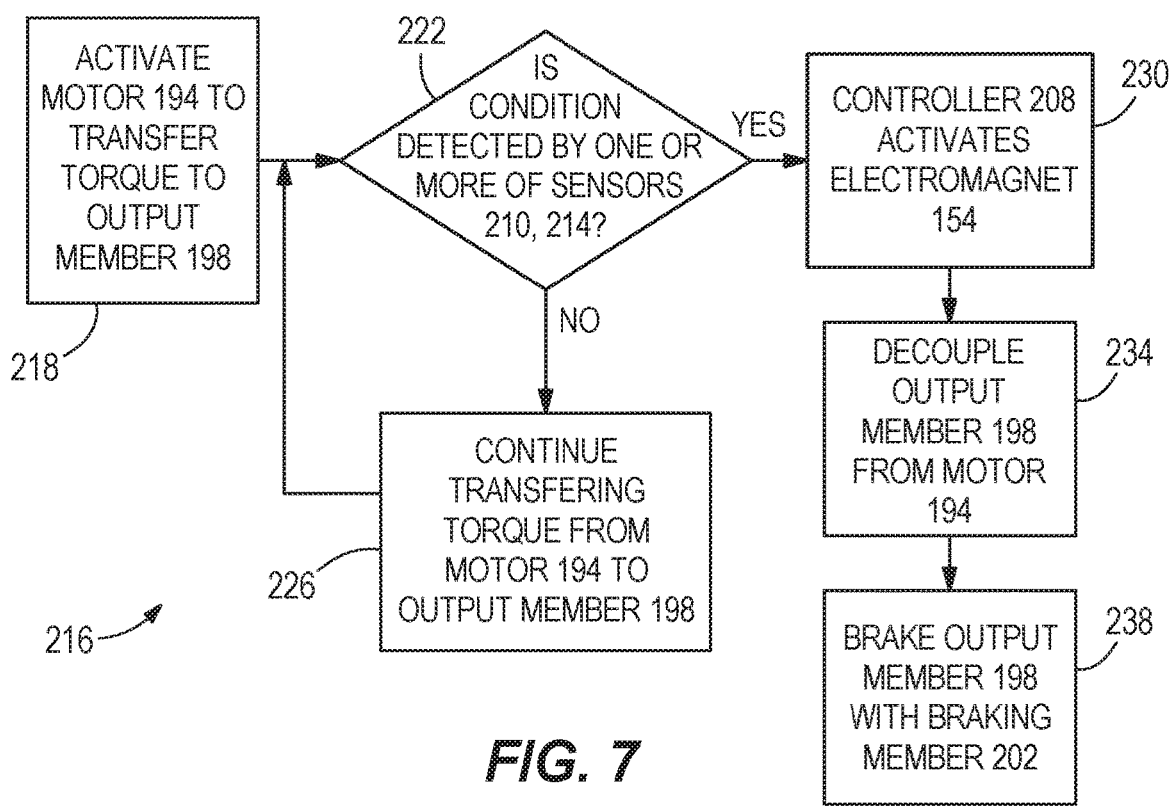
FIG. 7 illustrates a method of operating the tool of FIG. 6.

As shown in FIG. 7, a method 216 of operating the power tool 186 with the electromagnetic clutch mechanism 118 is illustrated. At step 218, the controller 208 activates the motor 194 with the electromagnetic clutch mechanism 118 in the first state, such that torque is transferred from the motor 194 to the output member 198. At step 222, the controller 208 checks whether one of the conditions described above has been detected by one or more of the sensors 210, 214. If the condition has not been detected, the motor 194 continues transferring torque to the output member 198, as shown at step 226. If the condition is detected, the controller 208 activates the electromagnet 154 of the electromagnetic clutch mechanism 118 in response, as shown at step 230, causing the electromagnetic clutch mechanism 118 to switch from the first state to the second state. The output member 198 is then moved by the activated electromagnet 154 and as shown at step 234, thereby decoupled from the motor 194, such that torque transfer from the motor 194 to the output member 198 is discontinued. After being decoupled from the motor 194, the output member 198 is further moved by the electromagnet 154 into another position, as shown at step 238, where the output member 198 is braked by the braking member 202.

Figure 10:
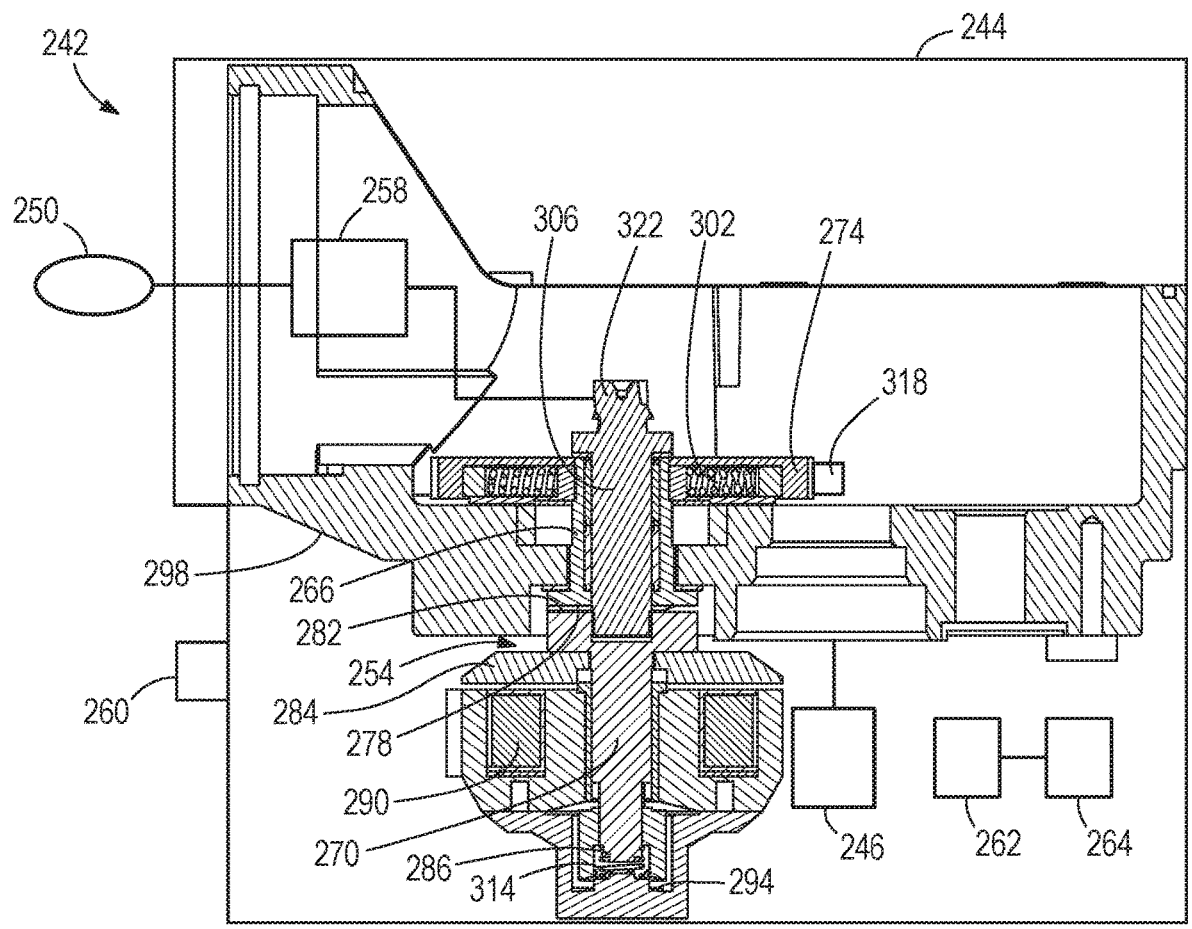
FIG. 10 is a cross-sectional view of a rotary power tool including an electromagnetic clutch mechanism.
Figure 11:
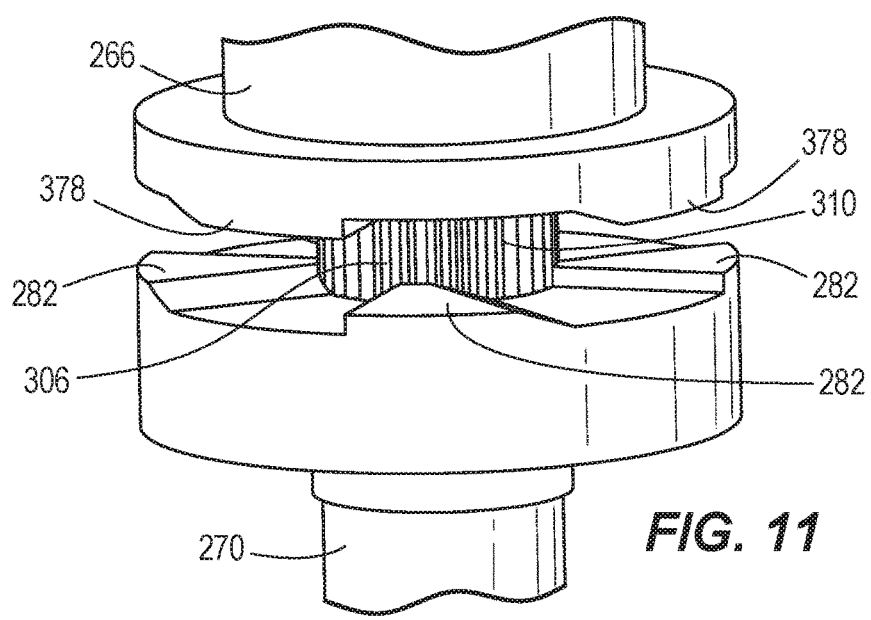
FIG. 11 is a perspective view of an input member, an output member, and an intermediate shaft of the clutch mechanism of FIG. 10.
Figure 12:
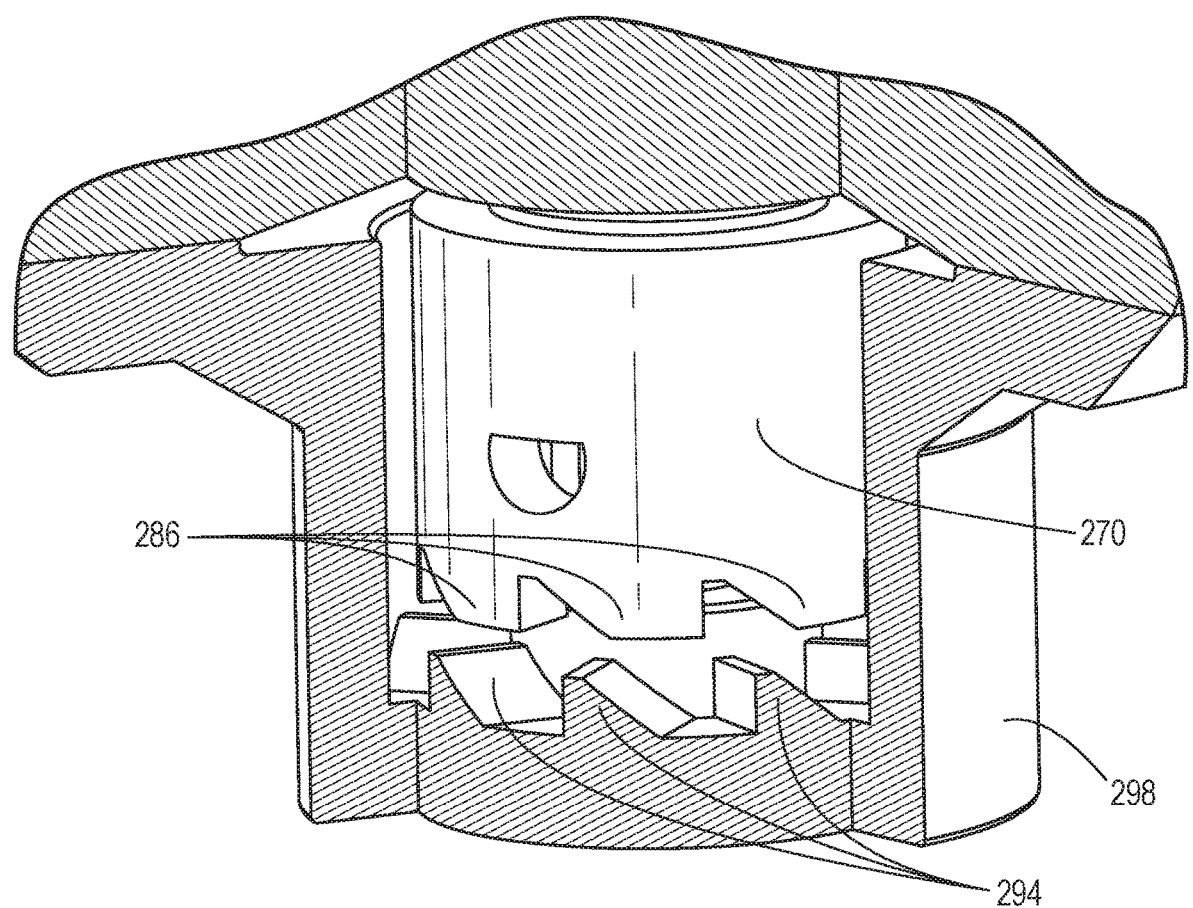
FIG. 12 is a cross-sectional view of a portion of the clutch mechanism of FIG. 10.

In another embodiment shown in FIGS. 10-12, a rotary power tool 242 (e.g. a rotary hammer) has a schematically illustrated housing 244, a motor 246, and a working member 250 that receives torque from the motor 246. The power tool 242 also includes an electromagnetic clutch mechanism 254 that selectively transfers torque from the motor 246 to a downstream transmission 258, which in turn transfers torque to the working member 250. The power tool 242 also includes a schematically illustrated trigger 260 to activate the motor 246, a controller 262, and a sensor 264. The trigger 260 is like the above-mentioned trigger 32 and the controller 262 is like one of the controllers 178, 208 described above. The sensor 264 is like one of the sensors 182, 210, 214 described above.

The electromagnetic clutch mechanism 254 includes an input member 266 and an output member 270. The input member 266 includes an input gear 274 and a first plurality of mating teeth 278. The output member 270 includes a second plurality of mating teeth 282 at a top end thereof (FIG. 11), a ferromagnetic plate 284 (FIG. 10), and a first plurality of locking teeth 286 at a bottom end thereof (FIG. 12). The electromagnetic clutch 254 also includes an electromagnet 290 and a second plurality of locking teeth 294 (FIG. 12) on a portion of a transmission housing 298. A mechanical clutch mechanism 302 is incorporated with the input gear 274 to limit the amount of torque that may be transferred from the motor 246 to the output member 270, and thus the working member 258.

The output member 270 is coupled for rotation with an intermediate shaft 306 via splines 310, but allowed to move axially with respect to the intermediate shaft 306, while the input member 266 is configured to rotate relative to the intermediate shaft 306. A spring 314 biases the output member 270 into a first position in which the second plurality of mating teeth 282 are engaged with the first plurality of mating teeth 278, and the first plurality of locking teeth 286 are spaced from the second plurality of locking teeth 294, resulting in co-rotation of the input member 266 and the output member 270.

In operation of the power tool 242, an operator depresses the trigger 260 to activate the motor 246. The electromagnet 290 is initially de-energized and the output member 270 is biased into the first position, causing the electromagnetic clutch mechanism 254 to be in a first state in which the output member 270 engages the input member 266 via the mating teeth, 278, 282 as described above. A motor output pinion 318 rotates the input gear 274 of the input member 266, which causes the output member 270 to co-rotate with the input member 266, allowing the output member 270 to receive torque from the motor 246. The rotation of the output member 270 causes the intermediate shaft 306 to rotate via the splines 310 (FIG. 11). An intermediate shaft pinion 322 (FIG. 10) of the intermediate shaft 306 thus rotates and transmits torque to the downstream transmission 258, which in turn transmits torque to the working member 250.

During operation of the power tool 242, the controller 262 repeatedly samples the output of the sensor 264 to detect one of the conditions described above. If, during operation, a condition is detected, the controller 262 energizes the electromagnet 290. As a result of the electromagnetic force developed by the electromagnet 290, the ferromagnetic plate 284 is magnetically attracted towards the electromagnetic 290. Thus, the output member 270 moves away from the input member 266, against the bias of the spring 314, from the first or driven position to a second position, causing the electromagnetic clutch mechanism 254 to switch to a second state in which the output member 270 is disengaged from the input member 266. Specifically, in the second position of the output member 270, the mating teeth 282 of the output member 270 are spaced from the mating teeth 278 of the input member 266 and thus, the output member 270 no longer receives torque from the motor 246.

In the second state of the electromagnetic clutch mechanism 254, corresponding to the second or disengaged position of the output member 270, the locking teeth 286 of the output member 170 are brought into engagement with the locking teeth 294 on the transmission housing 298. Thus, as soon as the locking teeth 286, 294 are engaged, the output member 270 ceases to rotate, thus causing the intermediate shaft 306, the intermediate shaft pinion 322, and thus the working member 250 to stop rotating.

Figure 13:
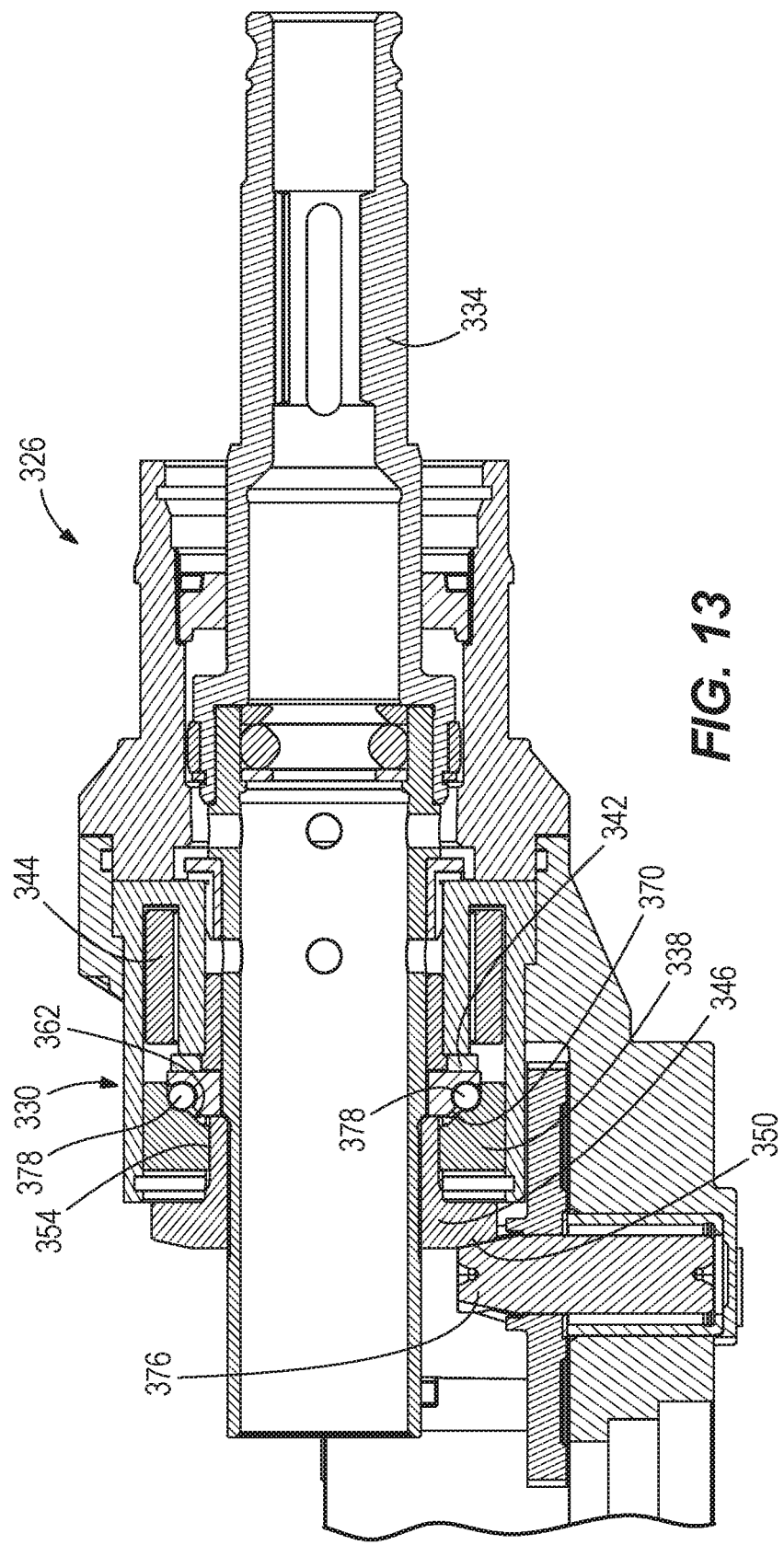
FIG. 13 is a cross-sectional view of a rotary power tool including an electromagnetic clutch mechanism.
Figure 14:
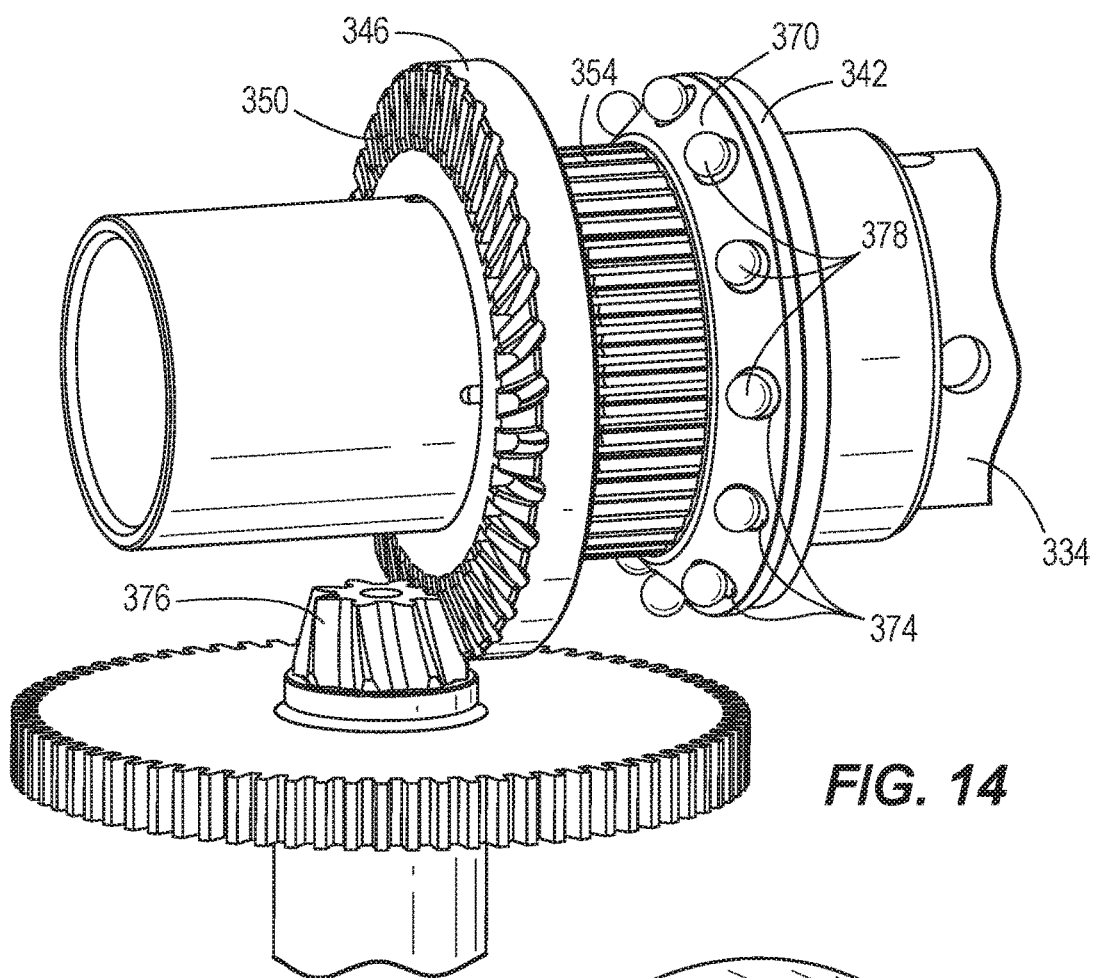
FIG. 14 is a perspective view of a portion of the clutch mechanism of FIG. 13, with portions removed.
Figure 15:
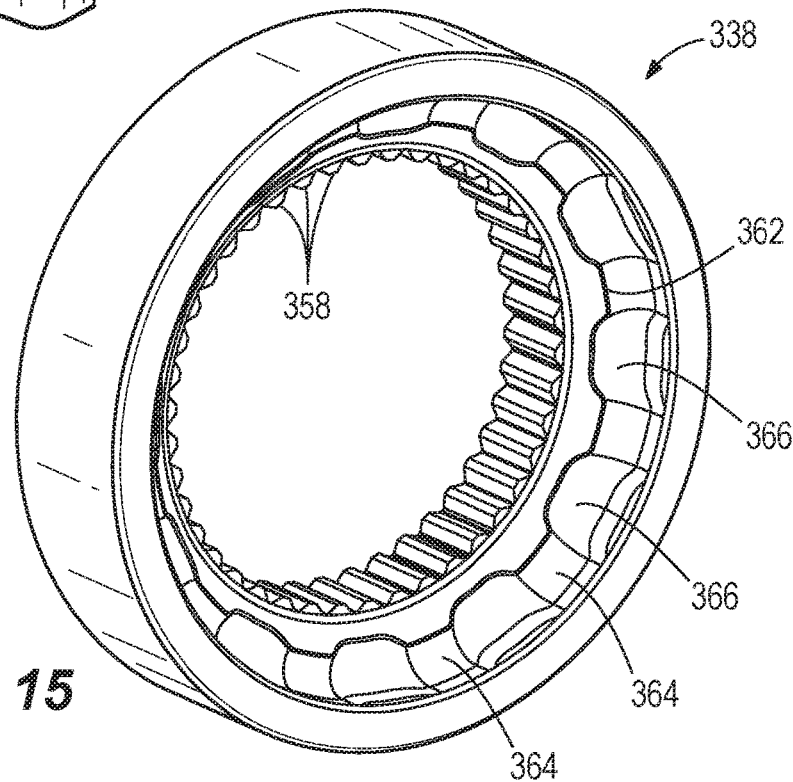
FIG. 15 is a perspective view of an input member of the clutch mechanism of FIG. 13.

In another embodiment shown in FIGS. 13-15, a rotary power tool 326 (e.g. a rotary hammer), of which only a portion is shown, includes an electromagnetic clutch mechanism 330 for varying the clutch setting and thus the torque transmitted from a motor (not shown) to a rotating spindle 334. The electromagnetic clutch mechanism 330 includes an input member, such as clutch driver 338, an output member, such as clutch plate 342, and an electromagnet 344 configured to magnetically attract the clutch driver 338.

The clutch driver 338 is arranged on an input gear 346 having a gear portion 350 and a splined portion 354 extending from the gear portion 350. The spindle 334 is not coupled for rotation with the input gear 346, such that the input gear 346 may rotate relative to the spindle 334. The clutch driver 338 has a plurality of splines 358 (FIG. 15) that mate with the splined portion 354 of the input gear 346, thereby coupling the clutch driver 338 for rotation with the input gear 346, but allowing the clutch driver 338 to move axially along the splined portion 354. The clutch driver 338 defines a first clutch face 362 having a plurality of peaks 364 and recesses 366.

The clutch plate 342 defines a second clutch face 370 (FIG. 14) having a plurality of spherical recesses 374 in which corresponding followers, such as ball bearings 378, are positioned, as shown in FIG. 13. The spindle 334 is coupled for co-rotation with the clutch plate 342, such that when the clutch plate 342 rotates, the spindle 334 also rotates.

When the electromagnet 344 is energized at a first strength, corresponding to a relatively higher clutch setting, the magnetic attraction of the electromagnet 344 causes the clutch driver 338 to be in a first position. In the first position, the ball bearings 378 (and thus the recesses 374 in the clutch plate 342) are rotationally aligned with the grooves 366 in the clutch driver 338, causing the clutch plate 342 to be engaged for co-rotation with the clutch driver 338. In the first position, the second clutch face 370 applies a first normal force, via the ball bearings 378, to the first clutch face 362.

When the electromagnet 344 is energized at a second strength, corresponding to a relatively lower clutch setting, the electromagnetic field produced by the electromagnet 334 is weaker than the electromagnetic field produced at the first strength. Thus, the clutch driver 338 is not as strongly attracted towards the electromagnet 334 as when the electromagnet 344 is energized at the first strength. As a result, the second clutch face 370 applies a second normal force, via the ball bearings 378, having a magnitude that is less than that of the first normal force, against the first clutch face 362. Thus, when the electromagnet 344 is energized at the second strength, the clutch driver 338 is moveable along the splined portion 354 of the input gear 346 from the first position to a second position, in which the clutch driver 338 is disengageable from the clutch plate 342, as described further below.

In operation, when the electromagnet 344 is energized at the first strength, the clutch driver 338 is in the first position. Once the motor is activated, the motor transmits torque to a bevel pinion 376 (FIG. 14), which meshes with and thus rotates the ring gear portion 350 of the input gear 346. Rotation of the input gear 346 causes the clutch driver 338 to rotate via the splined portion 354 and splines 358 (FIG. 15). Because the clutch driver 338 is in the first position, the clutch plate 342 rotates with the clutch driver 338, thus causing the spindle 334 to rotate. Because the first strength of the electromagnet 344 is sufficiently high, in the first position of the clutch driver 338, the clutch driver 338 is not disengageable from the clutch plate 342, even when the spindle 334 experiences a reaction torque while in operation.

However, when an operator reduces the torque setting of the electromagnetic clutch mechanism 330, the electromagnet 344 is accordingly energized at the second, weaker strength, in which the second clutch face 370 applies the second normal force to the first clutch face 362 via the ball bearings 378. Thus, in response to a sufficiently high reaction torque on the spindle 334 that exceeds the torque setting of the electromagnetic clutch mechanism 330, the clutch driver 338 may be axially displaced to a second position, in which it is disengagable from the clutch plate 342. In operation, once the motor is activated, the motor transmits torque to the bevel pinion 374, which rotates the ring gear portion 350 of the input gear 346. Rotation of the input gear 346 causes the clutch driver 338 to rotate via the splined portion 354 and splines 358. Initially, the clutch plate 342 rotates with the clutch driver 338, thus causing the spindle 334 to rotate.

However, when a reaction torque is imparted to the spindle 334 during operation, the rotational speed of the spindle 334 is reduced. Because the magnitude of the second normal force is less than that of the first normal force, the clutch driver 338 begins to rotate relative to the clutch plate 342 and translate away from the clutch plate 342. Specifically, the peaks 364 of the first clutch face 362 begin to ride up, but not over, the ball bearings 378 of the second clutch face 370, as the clutch driver 338 continues to transmit torque to the clutch plate 342.

When the reaction torque finally exceeds the torque setting of the electromagnetic clutch mechanism 330, the peaks 364 of the first clutch face 362 begin to ride up and over the ball bearings 378 of the second clutch face 370, causing the clutch driver 338 to reciprocate along the splined portion 354 against the magnetic force of the electromagnet 334. As a result, the clutch driver 338 becomes rotationally disengaged from the clutch plate 342. Thus, when the reaction torque exceeds the torque setting of the electromagnetic clutch mechanism 330, the clutch driver 338 rotationally decouples from the clutch plate 342, ceasing torque transfer from the motor to the spindle 334.

Similar to the embodiments described above, the rotary power tool 326 can also include a sensor and controller (not shown) which can detect a loss of tool control, in the same manner as described in earlier embodiments. If during operation of the rotary power tool 326 the loss of tool control is detected, the controller can de-energize the electromagnet 344, thus causing the clutch driver 338 to quickly disengage the clutch plate 342 as described above, thus ceasing torque transfer from the motor to the spindle 334

Various features of the invention are set forth in the following claims.

What is claimed is:

1. A clutch mechanism for use in a rotary power tool having a motor, the clutch mechanism comprising:
    an input member to which torque from the motor is transferred;
    an output member movable between a first position in which the output member is engaged with the input member for co-rotation therewith, and a second position in which the output member is disengaged from the input member;
    a biasing member biasing the output member into the first position; and
    an electromagnet which, when energized, moves the output member from the first position to the second position.

2. The clutch mechanism of claim 1, further comprising a brake member in facing relationship with the output member, wherein the brake member engages the output member when the output member is in the second position.

3. The clutch mechanism of claim 2, wherein the brake member includes a first brake surface in facing relationship with the output member, and wherein the first brake surface engages the output member when the output member is in the second position.

4. The clutch mechanism of claim 3, wherein a core of the electromagnet has a second brake surface in facing relationship with the output member, and wherein the second brake surface engages the output member when the output member is in the second position.

5. The clutch mechanism of claim 1, wherein the input member has a first surface and the output member has a second surface, and wherein the first surface is frictionally engaged with the second surface when the output member is in the first position.

6. The clutch mechanism of claim 5, wherein the input member and the output member each rotate about a shared rotational axis when the input member receives torque from the motor and the output member is in the first position, and wherein the first surface defines an acute angle with respect to the rotational axis.

7. The clutch mechanism of claim 6, wherein the acute angle is between 0 degrees and 24 degrees.

8. The clutch mechanism of claim 7, wherein the acute angle is between 10 degrees and 15 degrees.

9. The clutch mechanism of claim 8, wherein the acute angle is approximately 12 degrees.

10. The clutch mechanism of claim 6, wherein the first surface is frusto-conical.

11. The clutch mechanism of claim 10, wherein the second surface is frusto-conical.

12. The clutch mechanism of claim 1, wherein the input member has a first plurality of teeth and the output member has a second plurality of teeth, and wherein the first plurality of teeth are engaged with the second plurality of teeth when the output member is in the first position.

13. The clutch mechanism of claim 12, wherein the output member has a plurality of locking teeth, and wherein in response to the output member being moved from the first position to the second position, the plurality of locking teeth of the output member engage a mating plurality of locking teeth on a housing of the rotary power tool, such that rotation of the output member is discontinued.

14. The clutch mechanism of claim 1, wherein the output member has a plurality of locking teeth, and wherein in response to the output member being moved from the first position to the second position, the plurality of locking teeth of the output member engage a mating plurality of locking teeth on a housing of the rotary power tool, such that rotation of the output member is discontinued.

15. The clutch mechanism of claim 1, wherein the input member is disposed about a first shaft that receives torque from the motor for rotation therewith, and the output member is disposed about a separate second shaft for rotation therewith, and wherein the second shaft is configured to rotate in response to rotation of the first shaft when the output member is in the first position.

16. The clutch mechanism of claim 15, further comprising a first bearing arranged within the input member and rotatably supporting an end of the second shaft.

17. The clutch mechanism of claim 1, wherein the input member includes an input gear that receives torque from the motor.

18. The clutch mechanism of claim 17, wherein the input gear includes a mechanical clutch mechanism configured to limit the amount of torque transferred from the motor to the output member.

19. The clutch mechanism of claim 1, wherein the output member is coupled for rotation with a shaft having splines, and is configured to move axially with respect to the shaft between the first and second positions.

20. The clutch mechanism of claim 19, wherein the input member is arranged about the shaft and configured to rotate relative to the shaft.

* * * * *